M. D. RIKER.
THREAD BUSHING.
APPLICATION FILED JAN. 7, 1919.
1,363,353. Patented Dec. 28, 1920.
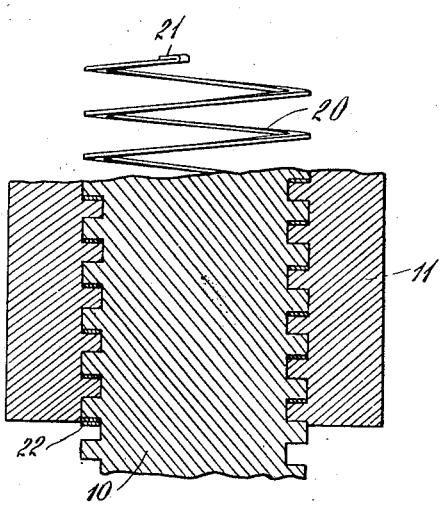
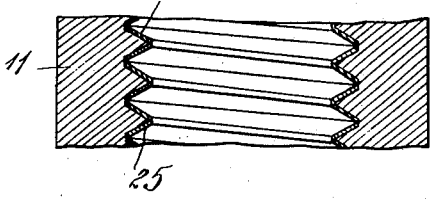
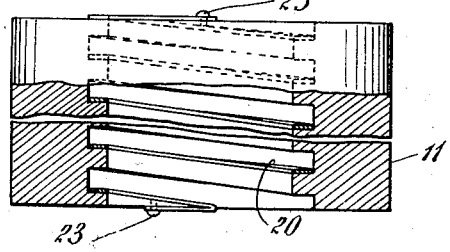
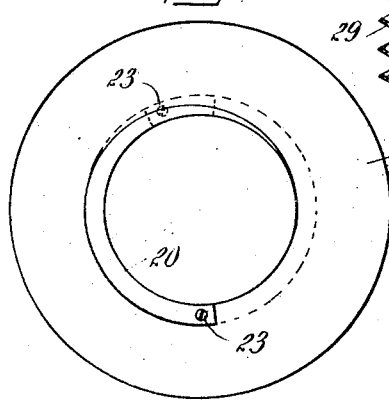
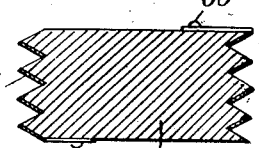
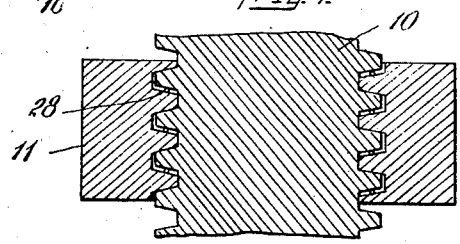
INVENTOR
Malcolm D. Riker
BY
Marshall & Dearborn
ATTORNEYS

UNITED STATES PATENT OFFICE.

MALCOLM D. RIKER, OF DOVER, NEW JERSEY.

THREAD-BUSHING.

1,363,353.    Specification of Letters Patent.    Patented Dec. 28, 1920.

Application filed January 7, 1919. Serial No. 270,002.

*To all whom it may concern:*

Be it known that I, MALCOLM D. RIKER, a citizen of the United States of America, and a resident of Dover, Morris county, and State of New Jersey, have invented certain new and useful Improvements in Thread-Bushings, of which the following is a specification, reference being had to the accompanying drawings, forming a part thereof.

My invention relates to new and useful improvements in thread bushings, and its object is to provide between adjacent surfaces of a screw and nut, an independent member of bearing metal. More specifically, the object of this invention is to provide a helical bushing which may be interposed between the bearing surfaces of a screw and its nut.

A still further object is to make possible the use of a cheap metal such as cast iron for the body portion of a nut, and to give such a nut the advantages of one of expensive bearing metal such as bronze, by covering a surface of the cast iron nut with a helical bushing of bronze.

In order that my invention may be thoroughly understood, I will now proceed to describe the same in the following specification, and will then point out the novel features thereof in appended claims.

Referring to the drawings:

Figure 1 is a sectional elevation of a nut and screw provided with a thread bushing made according to and embodying this invention.

Fig. 2 is an elevation partly in section of a screw and nut provided with a thread bushing and illustrates a different way of fastening the bushing.

Fig. 3 is a plan view of the parts shown in Fig. 2.

Figs. 4, 5 and 6 are sectional elevations of portions of nuts provided with thread bushings of different modified constructions, which are shown to illustrate different embodiments of the invention.

Fig. 7 is a sectional elevation of a screw and nut with an interposed thread bushing of modified form.

Fig. 8 is a sectional elevation of a screw with bushing of my invention applied to its thread.

Like characters of reference designate corresponding parts in all the figures.

10 designates a screw, and 11 is a nut with which the screw coöperates. These terms are used generally, the screw being any member having a cylindrical portion with an external helical thread thereon, and the nut being any body with a cylindrical orifice in which is an internal thread with which the thread of the screw coöperates. According to the forms of my invention which are shown in Figs. 1–3, and 6 and 8, the thread of the nut while of the same pitch as that of the screw, is somewhat wider, so that when the upper surface of the thread of the screw is in contact with the lower surface of the thread of the nut, there is a helical space left between the lower surface of the screw thread and the upper surface of the nut thread.

20 is a flat helical strip preferably of antifriction metal such for example as phosphor bronze, of the same pitch as that of the threads, and as shown in Figs. 1–3 and 6, of the same width as that of the face of the thread. This is turned or screwed into the helical space just described and thus forms a bushing or bearing between two of the adjacent surfaces of the threads. The upper end of this bushing strip may be bent over as at 21 or otherwise enlarged, to limit the extent to which the strip may be screwed into the nut. After it has been screwed in as far as it will go, its lower end which then protrudes through the nut may be bent over as at 22, or otherwise enlarged to prevent its removal. These enlarged ends then prevent rotation of the bushing. The upper surface of the bushing strip which then contacts with the thread of the screw is made with a smooth finish, but its under surface and the upper surface of the nut thread, may be rough to further prevent any tendency of the bushing to rotate.

Instead of enlarging the ends of the strip bushing, holes may be drilled near its ends through which screws 23 may be put into the nut 11. Such a construction is illustrated in Figs. 2 and 3.

In Fig. 4 a helical bushing 24 is shown of trough-like cross-section which has portions which fit over the upper and lower surfaces of the thread of the nut and a connecting part which lies across the base of the thread.

Fig. 5 illustrates a helical bushing 25 of V-shaped cross-section which lies across the upper and lower surfaces and over the apex of the nut thread.

Fig. 6 is added to show that when a single strip bushing is used it need not be flat, but may be formed as at 26 to conform to the cross-sectional contour of the thread.

Fig. 7 shows the bushing 28 as circular in cross-section.

It is not necessary to apply the bushing to the thread of the nut, but if desired it may be applied to the thread of the screw, as shown at 29 in Fig. 8. Its ends may be fastened in some suitable manner as by screws 30.

This thread bushing has obvious advantages, such as reducing the friction, making possible the use of cheaper materials and also of replacement after wear. I have described one way of putting the bushing in place but am in no way limited to this particular way. Several forms and constructions have been illustrated and described for the purpose of showing ways in which this invention may be used, but the inventive thought upon which this application is based is broader than these illustrative embodiments and I intend no limitations other than those imposed by the appended claims.

What I claim is:

1. The combination with an internally screw-threaded member, of an independently formed helical strip of relatively hard anti-friction bearing metal having the convolutions thereof free and disconnected at the edges and disposed in engagement with and forming the bearing surface of the thread.

2. The combination with an internally screw-threaded metallic member of an independently formed helical metal strip having substantially relatively hard and anti-frictional bearing qualities of bronze, said helical strip having the convolutions thereof free and disconnected at their adjacent edges and disposed in engagement with and forming the bearing surface of the screw-thread.

3. The combination with a screw-threaded metallic member, of an independently formed helical metallic strip having the convolutions thereof disposed in flat engagement with one surface of the thread, the meeting surfaces of said thread and the helical strip being relatively rough to produce a frictional lock between the thread and strip and the outer or exposed face of the strip being relatively hard and smooth to form an anti-friction bearing surface for the thread.

4. The combination with a screw-threaded member, of an independently formed helical strip of relatively hard anti-friction bearing metal having the convolutions thereof free and disconnected at the edges and disposed in flat engagement with one wall of the screw-thread to form a bearing surface therefor and means engaged with the helical bearing strip at one end thereof for securing the same against rotation on the screw-thread.

5. The combination with a screw-threaded member, of an independently formed helical strip of relatively hard anti-friction bearing metal having the convolutions thereof free and disconnected at the edges and disposed in flat engagement with one wall of the screw-thread to form a bearing surface therefor, said helical bearing strip having a thickened portion at one end thereof for securing the same against rotation on the screw-thread.

6. The combination with a nut, of a separately formed helical strip of relatively hard bearing metal having the convolutions thereof free and disconnected at the edges and disposed in flat engagement with one wall and forming the bearing surface of the screw-thread and means for securing said helical bearing strip against rotation on the screw-thread of the nut.

7. The combination with a screw and a nut engaged therewith, of a helical strip of relatively hard anti-friction bearing metal having the convolutions thereof free and disconnected at the edges and disposed in flat engagement with the thread of one of said members and forming an anti-frictional bearing surface for said thread.

In witness whereof, I have hereunto set my hand this 2nd day of January, 1919.

MALCOLM D. RIKER.